United States Patent

Aswell et al.

[11] Patent Number: 6,025,589
[45] Date of Patent: Feb. 15, 2000

[54] APPARATUS AND METHOD FOR NORMALIZING MULTIPLE COLOR SIGNALS

[75] Inventors: Cecil J. Aswell, Orangevale, Calif.; John H. Berlien, Jr., Plano; Eugene G. Dierschke, Dallas, both of Tex.

[73] Assignee: Texas Instruments Incorporated, Dallas, Tex.

[21] Appl. No.: 09/002,639

[22] Filed: Jan. 5, 1998

Related U.S. Application Data

[60] Provisional application No. 60/035,756, Jan. 6, 1997.
[51] Int. Cl.[7] ............................................... H04N 1/56
[52] U.S. Cl. ............... 250/226; 250/208.1; 250/214 A; 348/223; 358/406
[58] Field of Search ............................ 250/226, 208.1, 250/214 A; 358/406; 348/223, 222

[56] References Cited

U.S. PATENT DOCUMENTS

| | | | |
|---|---|---|---|
| 5,233,180 | 8/1993 | Tsuruta et al. | 250/208.1 |
| 5,424,774 | 6/1995 | Takayama et al. | 348/222 |
| 5,448,056 | 9/1995 | Tsuruta | 250/214 A |
| 5,506,430 | 4/1996 | Ohzu | 257/292 |
| 5,729,361 | 3/1998 | Suggs et al. | 358/505 |

*Primary Examiner*—Edward P. Westin
*Assistant Examiner*—Thanh X. Luu
*Attorney, Agent, or Firm*—Mark E. Courtney; W. James Brady, III; Richard L. Donaldson

[57] ABSTRACT

Color optical sensor array (11) having a color optical sensor (13) with each color optical sensor (13) having a color photodetector (56) and an active integrator circuit. The active integrator circuit having an operational amplifier (50) and an integrating capacitor (51), the active integrator circuit operating to integrate and normalize the electrical signal from color photodetector (56).

15 Claims, 3 Drawing Sheets

APPARATUS AND METHOD FOR NORMALIZING MULTIPLE COLOR SIGNALS

This application claims priority under 35 USC § 119(e)(1) of provisional application No. 60/035,756 filed Jan. 6, 1997.

CROSS-REFERENCE TO RELATED PATENT APPLICATIONS

This patent is related to the following co-pending patent applications: Ser. No. 09/022,731, entitled Apparatus and Method for a Managed Integration Optical Sensor Array, Attorney's Docket TI-23302; and Ser. No. 09/002,904, entitled Apparatus and Method for Active Integrator Optical Sensors, Attorney's Docket TI-23303. Each of the above entitled co-pending applications is assigned to Texas Instruments Incorporated.

TECHNICAL FIELD OF THE INVENTION

This invention relates generally to color optical sensor arrays, and more particularly to normalizing color signals from an active integrated color optical sensor array.

BACKGROUND OF THE INVENTION

Optical sensors are used in a number of applications ranging from digitizing a photographic image for display or color printing to optical communications systems. Optical sensors generally operate by detecting electromagnetic energy and producing an electrical signal that corresponds to the intensity of the electromagnetic energy striking the optical sensor. Multiple optical sensors are generally used and are often geometrically positioned in arrays with individual optical sensors corresponding to a respective pixel in the resulting electronic display. The terms "pixel" and "optical sensor" as often used in the art and as used in this application are interchangeable with each other. Optical sensor arrays allow a larger spatial area to be scanned than could otherwise be performed by a single optical sensor. Some applications may use raster scan techniques in which fewer optical sensors are needed but an object or document is scanned in an incremental pattern until the object or document has been completely scanned.

Color sensitive or color discriminating optical sensors may be used to detect electromagnetic energy in specific wavelengths in the electromagnetic energy spectrum. Frequently, electromagnetic energy in discrete ranges corresponding to the colors, red, blue and green, is detected by separate color optical sensors. An electrical signal corresponding to the intensity of the electromagnetic energy from the respective optical sensors for each color is recorded to form a digitized representation of each area of the object or document. A color optical sensor array generally comprises multiple groups of photodetectors with each group sensitive to a described color and an electrical circuit corresponding to each individual photodetector in the group.

Each photodetector within a color optical sensor array produces an electrical signal in proportion to a selected range of electromagnetic energy striking the photodetector. The photodetector may have a filter or coating that allows only electromagnetic energy in the selected range of wavelengths selected to pass through and strike the photodetector. A wide variety of filters and coatings may be used. For example, photodetectors with a coating sensitive to red would only allow electromagnetic energy corresponding to the color red to strike the photodetector. The associated electrical circuit stores an electrical signal proportional to the "red" electromagnetic energy striking the photodetector.

Photodetectors are generally selected to detect electromagnetic energy in a specific bandwidth that is optimized for each application. Photodetectors can be manufactured from different materials and by different processes to detect electromagnetic energy in varying parts of the electromagnetic spectrum and over varying bandwidths within the spectrum. A photodetector can be manufactured to detect electromagnetic energy corresponding to specific parts of the electromagnetic spectrum other than just visible color. The term "color photodetector" as used in this application includes any photodetector that responds to electromagnetic energy in a specific and predetermined range of the electromagnetic spectrum. Thus, this application is not limited to photodetectors that only detect electromagnetic energy that corresponds to the colors red, green and blue.

An electrical signal from an optical sensor is typically conditioned by an output modifier. The output modifier conditions the signal or converts the electrical signal into an output signal that can be easily understood by a signal processor such as a computer. In one application, a computer may assemble the various output signals and display the resulting picture on a color monitor or print the resulting picture using a color printer. In another application, a computer may use the output signals to determine the color of water in a river to detect the amount and types of pollution. The applications in which color optical sensor arrays can be used is without bound.

Optical sensors may be manufactured in many semiconductor technologies including MOS (Metal Oxide Semiconductors), CMOS (Complementary MOS), I2L, J-FET, or Bi-CMOS. Each of the manufacturing technologies have trade offs with respect to performance, manufacturing cost, and required associated supplies and interface circuits. Optical sensors have previously been manufactured based on CCD (Charge Coupled Device) technology. Generally CCD's require a dedicated process technology, require multiple supplies, require more complicated interface electronics, and have limited capability for integrating other electronic functions and are generally more expensive than the other available technologies.

One type of color optical sensor includes a passive integrator electrical circuit. In the passive integrator, a photodiode (and its associated junction capacitance and attached parasitic capacitance) are prebiased to a high reverse voltage. The photodiode generates a photocurrent which discharges the capacitance, thereby causing the voltage to decrease. The output voltage for this type of optical sensor is generally non-linear with respect to the integrated charge since the diode capacitance is a function of the diode voltage.

A further disadvantage of the passive integrator is that the integrating capacitance (photodiode and parasitic capacitances) is determined primarily by the photodiode size. Thus sensitivity cannot be increased by increasing the photodiode size since the capacitance will increase approximately proportionally.

A further disadvantage of the passive integrator is that the high reverse voltage during operation will cause dark current to flow even in absence of light. A high dark current diminishes the usable data that can be obtained from the optical sensor. Also, variations of the dark current between photodiodes in an array due to process variation will cause an output non-uniformity.

An additional disadvantage with using some previous passive integrator electrical circuits is that in color applications, the correlation between the output signal from the photodetector varies depending upon the color, or wavelength (energy level) of the electromagnetic energy detected by the photodetector. Thus, for a given intensity of electromagnetic energy related to the color red striking the color optical sensor, the same intensity of electromagnetic energy related to the color blue will produce a lower strength electrical signal from the color optical sensor. For a given intensity of electromagnetic energy striking a photodetector, the red photodetector will produce the strongest electrical signal in comparison to green and blue photodetectors. The green photodetector produces a smaller electrical signal than the red photodetector but stronger than the blue photodetector. The blue photodetector produces the smallest electrical signal in comparison to the red and green photodetectors. Thus, the electrical signal from each color optical sensor must be normalized to correct the strength of the electrical signal to correspond to the correct representation of the color on the object or document. A prior method of normalizing the electrical signal from different color optical sensors was to program the computer processor with a correction value for each color.

SUMMARY OF THE INVENTION

Accordingly, a need has arisen in the art for an improved color optical sensor array. The present invention provides an active integrator electrical circuit for use with a color optical sensor that addresses shortcomings of the prior color optical sensor arrays. The present invention may include using an optical sensor as shown in copending U.S. patent application Ser. No. 09/002,904, entitled Apparatus and Method for Active Integrator Optical Sensors, Attorney Docket No. TI-23303 and is hereby incorporated by reference. The present invention also teaches an optical sensor that includes a photodetector and an active integrator electrical circuit wherein the active integrator circuit comprises an operational amplifier and an integrating voltage storage device.

For some applications, embodiments of the present invention may preferably be manufactured using CMOS technology. This allows the color optical sensor to be manufactured in a technology that is much cheaper than the prior art which needed the performance characteristics of CCD technology to function. However, other technologies may be used to manufacture a color optical sensor using an active integrator architecture in accordance with teachings of the present invention.

A color optical sensor array incorporating the teachings of the present invention will preferably include a photodetector coated with a layer of material that blocks all electromagnetic energy except that electromagnetic energy which corresponds to the color or wavelengths chosen for that photodetector. The present invention teaches that the integrating capacitor used for the integrating voltage storage device is matched to the specific photodetector to provide optimal sensitivity to the electromagnetic energy in the desired bandwidth. By decreasing the associated integrating capacitance, the sensitivity of the color optical sensor is increased. In applications where the intensity of the electromagnetic energy striking the photodetector is high, the capacitance of the integrating capacitor can be increased to correspond to increased electrical signal strength from the photodetector, thereby optimizing the color optical array for the specific application in which it is used. A preferred embodiment uses one or more photodiodes for a photodetector.

In addition to customizing the color optical sensor for the application, the color optical sensor array may normalize the electrical signal from the photodetector to correct for the differences in electrical signal strength. In one embodiment, the capacitance of the integrating capacitor can be varied to increase the strength of the signal from the green and blue optical sensors to match that of the red optical sensor, thereby normalizing the electrical signals in the optical sensor array.

In another embodiment, the electrical signal output from the different color optical sensors may be normalized by varying the size of the aperture that allows electromagnetic energy to strike the photodetector. Thus, the photodetector corresponding to the color red would have the smallest aperture, thereby providing less area for electromagnetic energy to strike the photodetector, producing a lower strength electrical signal output from the color optical sensor. The photodetector corresponding to the color blue would have the largest aperture, thereby providing the greatest area for electromagnetic energy to strike the photodetector, which would produce the strongest electrical signal output from the color optical sensor. The photodetector corresponding to the color green would be manufactured with an aperture sized between the red and blue aperture. In this embodiment, the electrical signal output is normalized to the electrical signal produced by the blue photodetector. In a preferred embodiment, one or more photodiodes are used as the photodetector.

Technical advantages of the present invention include normalizing the signals from photodetectors that detect different colors or wavelengths of electromagnetic energy. Normalization occurs within the optical sensor itself and there is no longer a need to incorporate a color correction value into the computer processor to normalize the electrical signal output.

Another technical advantage of the present invention is providing an active integrator which can be used to integrate currents from non-ideal current sources having a finite impedance or voltage compliance limitation, such as a color photodiode. The active integrator architecture provides an electrical signal that is generally linearly proportional to the integrated photo current from the photodetector.

A further technical advantage of the present invention is that the speed of the system is enhanced. By keeping the photodiode biased at or near zero voltage so that a photo current is not required to charge the diode capacitance of the photodiode, the speed of the color optical sensor is increased. In addition, by normalizing the signal strength of the color optical sensor in the electrical circuit, the number of instructions that a computer processor must complete is reduced.

Although the present invention has been described with several embodiments, various changes and modifications may be suggested to one skilled in the art. It is intended that the present invention encompass such changes and modifications as fall within the scope of the following claims.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

The preferred embodiments of the present invention and its advantages are best understood by referring in more detail to FIGS. 1–9 of the drawings, in which like names refer to like parts throughout the several views.

For purposes of this application the term "photodetector" includes any detector that responds to radiant energy; examples include photoconductive cells, photodiodes, photoresistors, photoswitches and phototransistors.

Figure 1:
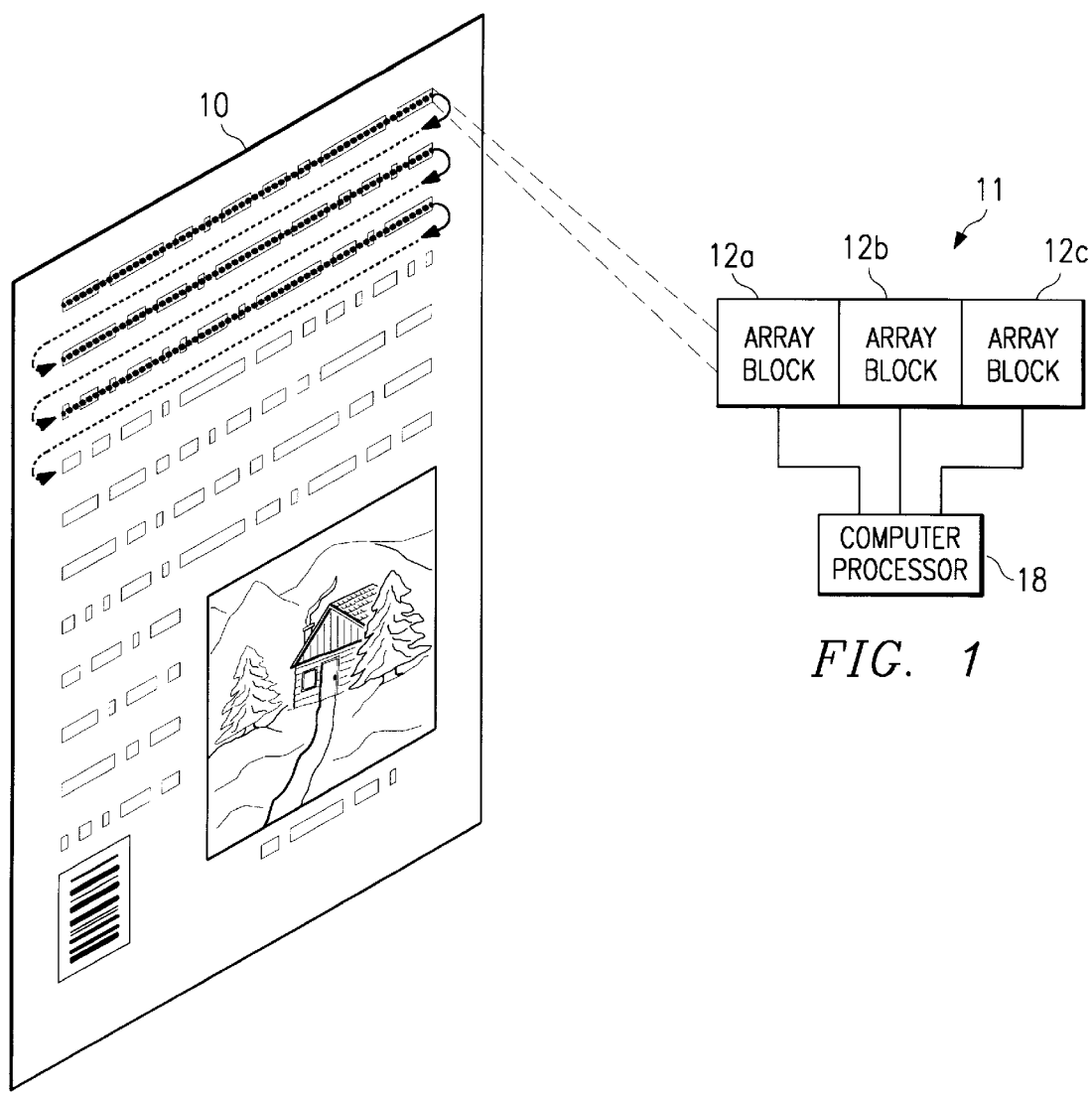
FIG. 1 is a schematic block diagram showing a document being scanned by a color optical sensor array incorporating teachings of the present invention using a raster scan technique.

FIG. 1 is a schematic block diagram showing color optical sensor array 11 constructed in accordance with teachings of the present invention. During a typical scanning operation, color optical sensor array 11 will detect electromagnetic energy reflected from or passing through document 10. A source of electromagnetic energy (not shown) such as natural light or artificial light of many kinds, including coherent light from a laser may be satisfactorily used with the present invention. Color optical sensor array 11 produces an electrical output corresponding to such electromagnetic energy from document 10. Computer processor 18 may assemble the electrical output into an electronic map or picture of document 10 for display, transmission, printing or further processing.

Document 10 may be scanned by several methods. FIG. 1 shows document 10 being scanned by a rastering technique. Document 10 is scanned incrementally both vertically and horizontally in a selected pattern until document 10 has been fully covered. Each array block 12 generally contains multiple optical sensors 13 (FIG. 3) configured in color groups that are sensitive to a range of electromagnetic energy wavelengths corresponding to a selected color. Document 10 is incrementally scanned in a pattern such that each color group in array block 12a, 12b and 12c corresponding to each color passes over the same location on document 10. Thus, each location on document 10 will produce three separate electrical signals that correspond to three respective colors present at that location. Another embodiment may configure array block 12 with multiple rows and columns of optical sensors 13 such that only a single array block 12 is required. Rastering often requires a smaller number of array blocks 12 and/or individual optical sensors 13.

A wide variety of signal processors may be satisfactorily used with color optical sensor array 11 in addition to computer processor 18. Output modifier 17 (not shown) is generally a charge to voltage amplifier. However, output modifier (not shown) could also be an analog to digital (A/D) converter. Computer processor 18 assembles each respective output signal from each optical sensor 13 to form an electronic map or picture of document 10 with each location of document 10 having three signals representing the color of that location.

Figure 2:
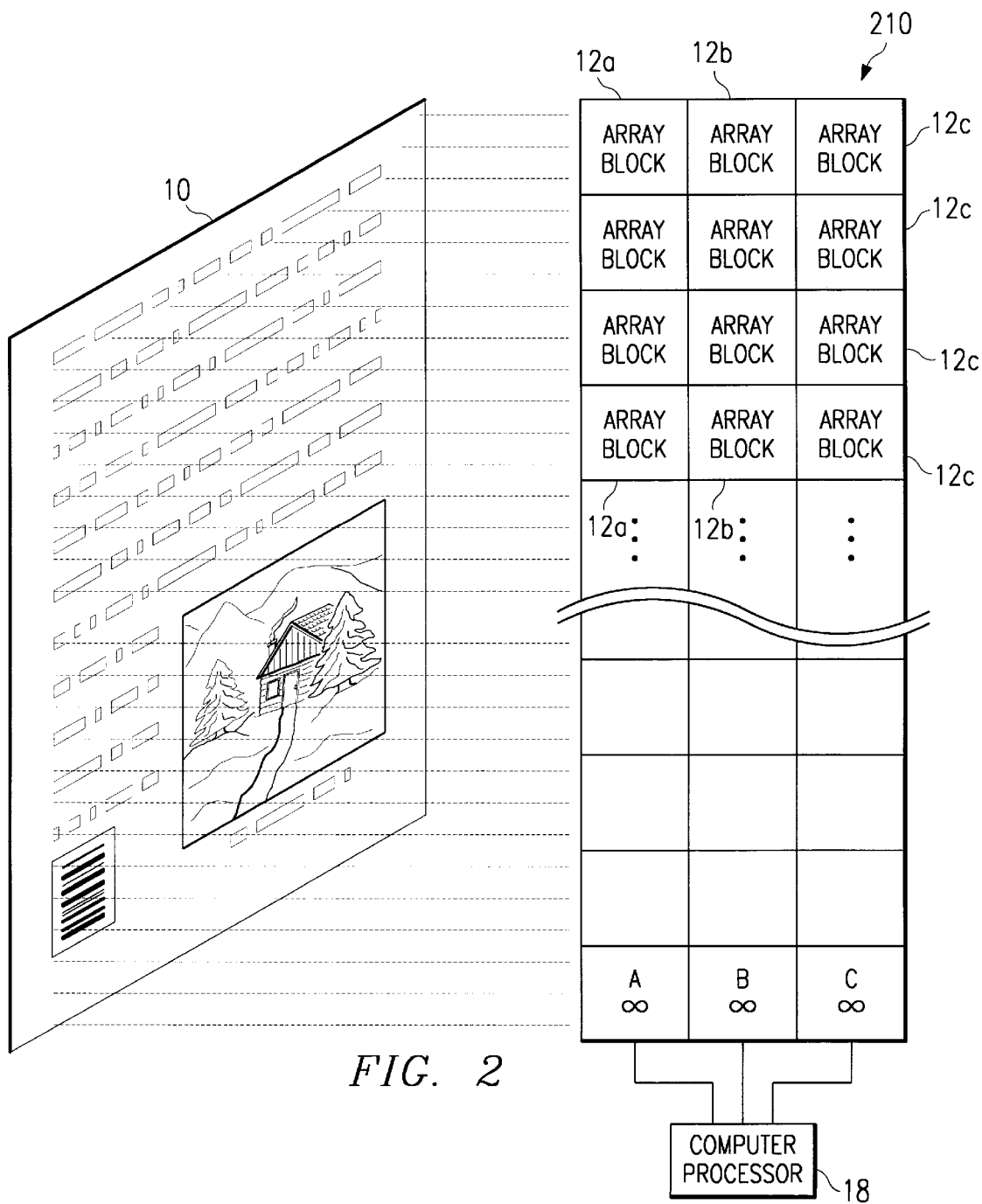
FIG. 2 is a schematic block diagram showing a document being scanned by a color optical sensor array incorporating teachings of the present invention.

FIG. 2 shows a method of scanning document 10 using color optical sensor array 210 incorporating another embodiment of the present invention. By properly selecting the size of color optical sensor array 210, document 10 can be efficiently scanned in one pass or operation.

In one embodiment, each column, "A," "B," and "C," of color optical sensor array 210 may generally contain array blocks 12 that include a plurality of optical sensors 13 (FIG. 3) that are respectively sensitive to one of three colors. For example, column "A" of color optical sensor array 210 may include optical sensors 13 that detect or are sensitive to the color red. Column "B" may correspond to the color green and column "C" may correspond to the color blue.

In another embodiment, color optical sensor array 210 may comprise a single array block 12, in which array block 12 contains a M by N configuration of optical sensors 13 that correspond to the colors red, green, and blue. Color optical sensor array 210 may be configured with optical sensors 13 or groups of optical sensors 13, that correspond to different colors, in any pattern or configuration, including a linear color optical sensor array (not shown).

In operation, document 10 may pass over or under the color optical sensor array 210. A vertical slice of document 10 passes over column "A" which produces electrical signals that corresponds to the amount of electromagnetic radiation in the red wavelength in each specific location on document 10. The relative positions of document 10 and color optical sensor array 210 may be changed and the same vertical slice that passed over column "A" would pass over column "B" and a new vertical slice of document 10 would pass over column "A." Electrical signals corresponding to the amount of electromagnetic radiation in the selected green wavelength would be produced from optical sensors 13 in column "B" and electrical signals corresponding to red would be produced from color optical sensors 13 in column "A." Document 10 would again be moved, or in motion, and the electrical signals recorded for each of the three columns. In this embodiment, document 10 would pass over color optical sensor 210 a single time and each color, as shown by the strength of the respective signals from optical sensors 13 would be recorded for each location on document 10. Color optical sensor array 210 may be arranged in various geometric configurations, such as any general array having multiple columns and rows of array blocks 12a, 12b and 12c, a star or a geometric pattern (not shown) of array blocks 12a, 12b, and 12c.

Figure 3:
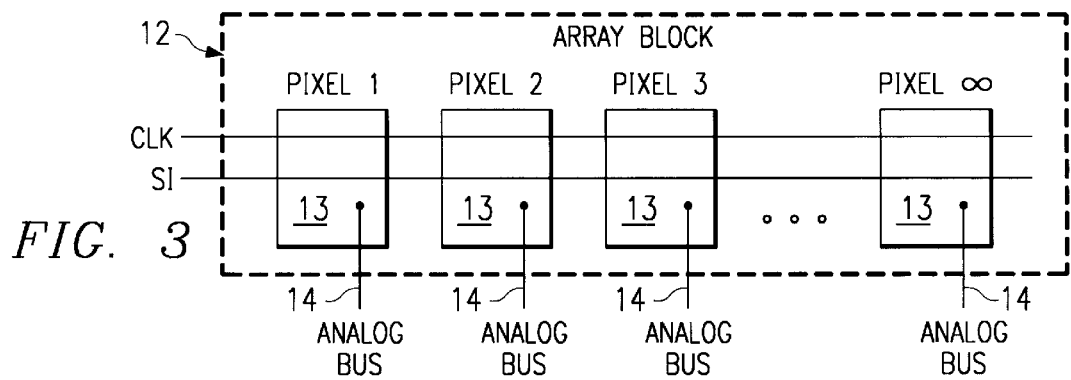
FIG. 3 is a schematic block diagram of a linear array block incorporating the teachings of the present invention having a clock signal and an input with each pixel having an electrical signal output.

FIG. 3 shows some of the constituent elements associated with each array block 12. Each array block 12 contains multiple optical sensors 13 within the respective array block 12. Generally, optical sensors 13 in an array block 12 are selected to detect the same color wavelength or range of wavelengths. However, array block 12 may contain groups of optical sensors 13 that correspond to different colors or selected wavelengths. Each optical sensor 13 may sometimes be referred to as a color pixel in array block 12 since each optical sensor 13 produces an electrical signal corresponding to a respective color pixel in the resulting electronic display. The number of color optical sensors 13 varies depending on the application. One preferred embodiment of the present invention includes 128 color optical sensors 13 in each array block 12. Each optical sensor 13 has an input clock signal ("CLK") and an input start signal ("SI"). Clock signal "CLK" is common to all optical sensors 13. However, input start signal "SI" can be specific to each optical sensor 13 or common to all optical sensors 13 within array block 12. In addition, each individual optical sensor 13 has an analog bus 14 which allows each optical sensor 13 to be measured simultaneously or in series.

The color optical sensor array 11 may also include a timing circuit (not shown) that provides timing sequencing for internal and external operation of the color optical sensor array 11 as shown in pending U.S. patent application Ser. No. 09/002,731, entitled Apparatus and Method for a Managed Integration Optical Sensor Array, Attorney's Docket TI-23302. In addition, the optical sensor array may incorporate an output modifier (not shown) that conditions the electrical signal into a usable form for a signal processor such as a general purpose computer processor.

Figure 4:
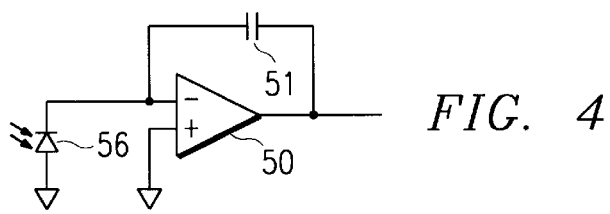
FIG. 4 is a schematic diagram of one embodiment of an active integrator electrical circuit that may be used with the present invention.

FIG. 4 is a schematic block diagram showing one embodiment of the active integrator color optical sensor as used in the present invention. Pending U.S. patent application Ser. No. 09/022,904, entitled Apparatus and Method for Active Integrator Optical Sensors, Attorney's Docket TI-23303, discloses active integrated optical sensors, and is hereby incorporated by reference.

Figure 8:
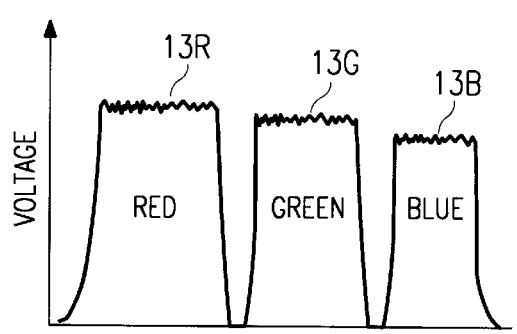
FIG. 8 is a voltage diagram of output signals from three optical sensors as shown in FIG. 7 which are respectively sensitive to red, green and blue electromagnetic energy with each output signal normalized in accordance with teachings of the present invention.

Color photodetector 56 may incorporate a film of material which blocks all electromagnetic energy from the color photodetector that does not correspond to the wavelengths selected for that color optical sensor 13. Thus, color photodetector 56 only produces an electrical signal in response to the wavelengths selected. The electrical signal from color photodetector 56 is output to the inverting input of op amp 50. Integrating capacitor 51 is coupled between the inverting input and the output of op amp 50. The capacitance of integrating capacitor 51 is varied depending upon the wavelength selected for that color optical sensor 13. By changing the capacitance of integrating capacitor 51, the electrical signal output from the color optical sensor 13 is normalized to the output from other color optical sensors 13 that correspond to different colors. Therefore, a color optical sensor 13 which corresponds to the color red may have an integrating capacitor 51 with high capacitance in comparison to an integrating capacitor 51 for a color optical sensor 13 corresponding to the colors of green or blue. Thus, red optical sensor 13 may have a relatively high capacitance integrating capacitor 51, green optical sensor 13 may have a relatively medium capacitance integrating capacitor 51, and blue optical sensor 13 may have a relatively low capacitance integrating capacitor 51. The result is a normalized output signal from color optical sensor array 11 as shown in FIG. 8.

Figure 5:
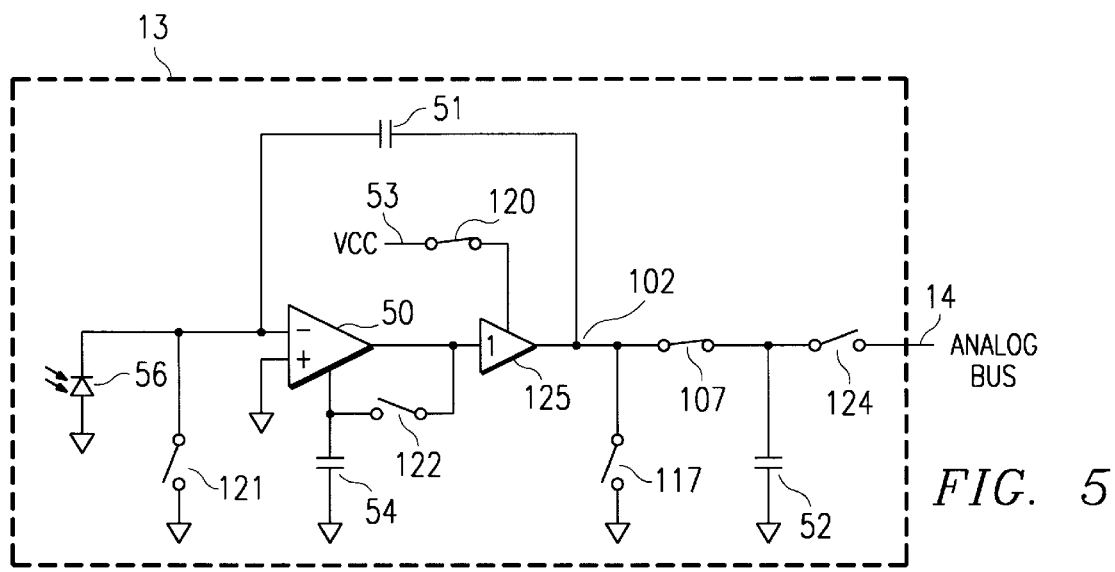
FIG. 5 is a schematic diagram of a preferred embodiment of the present invention showing a color optical sensor.

FIG. 5 shows the operation of color optical sensor 13 incorporating the preferred embodiment of the present invention. A color optical sensor 13 will generally operate in a cycle. The integrate and store portion of the cycle occurs when the active integrator electrical circuit stores a charge that is proportional to the electrical signal received from photodetector 56. At the conclusion of this portion of the cycle, the stored charge is transferred to an output modifier (not shown). An offset voltage correction and hold portion of the cycle may then be initiated. The offset correction effectively cancels out both the offset voltage across op amp 50 and the photodetector 56 during the integrate and store portion of the cycle.

Color optical sensor 13, as drawn, is in the integrate and store period or portion of the associated operating cycle. For purposes of explanation, it is assumed that an offset correction and hold period has previously taken place and an offset correction voltage is stored on offset capacitor 54. Output buffer 125 is active (switch 120 closed) and the voltage on store capacitor 52 is the same as the output at node 102 of the integrator (switch 107 closed).

The next time period or portion of the operating cycle is the offset correction and hold period. The preferred embodiment of the present invention uses capacitor offset correction and is described in further detail below.

To get to the offset correction and hold state from the integrate and store state, switch 107 is first opened so that the output at node 102 of the active integrator is stored on capacitor 52 and then switches 121, 117 and 122 are closed and switch 120 opened. The delay between opening switch 107 and actuating the other switches is in the order of a few nano-seconds and may be satisfactorily accomplished using conventional non-overlapping clock techniques.

Opening switch 120 disables output buffer 125. Closing switch 122 connects the output of op amp 50 to the offset cancellation feedback node. Closing switch 121 shorts the inverting input gate of op amp 50 and one end of integrating capacitor 51 to ground. Closing switch 117 shorts the other end of integrating capacitor 51 (node 102) to ground, thereby resetting the active integrator electrical circuit.

With both the inverting input and non-inverting input of op amp 50 at ground potential, the output of op amp 50 will drive the offset correction node (top of offset capacitor 54) such that the load currents for the input differential pair exactly match the currents through the differential pair. The effects of current mismatches due to random or systematic offsets are compensated for in this manner. Switch 122 is then opened, storing the offset correction voltage on offset capacitor 54. Switches 121 and 117 are then opened and switch 120 closed, activating the main integrator loop. The voltage at node 102 of the integrator is proportional to the photocurrent integrated since the end of the offset correction cycle, while the voltage on store capacitor 52 is representative of the previous integration period output. The voltage result of the previous integration cycle represented by the charge stored on store capacitor 52 is dumped onto analog bus 14 by closing switch 124.

After both the offset correction and hold period and the charge dump of store capacitor 52 has been completed the electrical circuit returns to the integrate and store state. The output voltage charge on store capacitor 52 may also have been dumped on analog bus 14 during the offset correction and hold period.

Although this embodiment is described in terms of having the non-inverting input of op amp 50 connected to ground and the various switches shorting everything to ground, a common DC reference voltage may be used.

Figure 6:
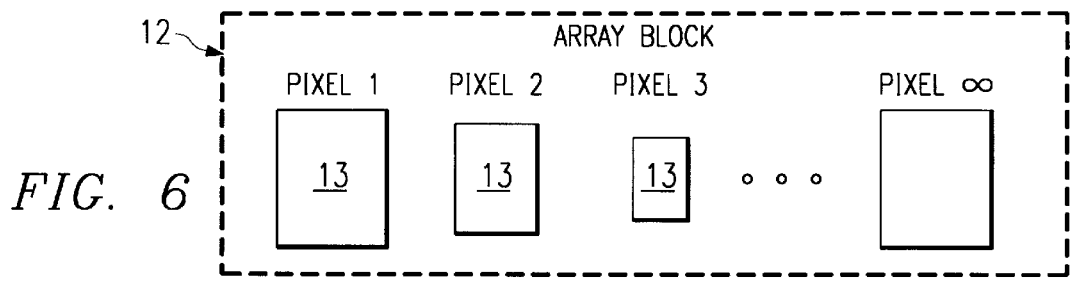
FIG. 6 is the schematic block diagram of a linear array block incorporating an embodiment of the present invention showing the different sizes of apertures to normalize the signals from photodetectors that correspond to different colors.

FIG. 6 shows another embodiment of the present invention for normalizing color signals. In this embodiment, an aperture restricts the amount of electromagnetic energy that can strike color optical sensor 13. The size of the aperture depends upon the color of the color optical sensor 13. For a color optical sensor 13 corresponding to the color blue, the aperture will be large in comparison to the aperture for color optical sensors 13 corresponding to the colors green and red. Thus, a red color optical sensor 13 will have an aperture that is small, a green color optical sensor 13 will have a medium sized aperture, and a blue color optical sensor 13 will have a large aperture. The normalized output signal from color optical sensor 13 is generally shown in FIG. 8.

Figure 7:
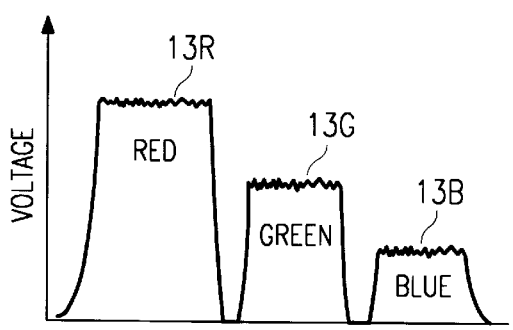
FIG. 7 is a voltage diagram of output signals from three optical sensors which are respectively sensitive to red, green and blue electromagnetic energy and the output signals have not been normalized.

FIG. 7 shows the voltage output from different color optical sensors 13 (not shown) from the prior art. The output signals show that for a constant intensity of electromagnetic energy, such as found from a white tungsten light, striking different color optical sensors 13R, 13G and 13B, the strength of the output signal varies depending upon the color.

FIG. 8 shows the voltage output from different color optical sensors 13R, 13G and 13B (FIG. 6) that incorporate the present inventive concept of normalizing the output signals within the respective color optical sensor 13 (shown in FIG. 5).

Although the present invention has been described with several embodiments, various changes and modifications may be suggested to one skilled in the art. It is intended that the present invention encompass such changes and modifications as fall within the scope of the following claims.

What is claimed is:

1. A color optical sensor array having at least two optical sensors that produce respective electrical signals proportionate to incident electromagnetic radiation comprising:

the color optical sensors selected to respond to electromagnetic radiation in different portions of the visible color spectrum;

each color optical sensor comprising a color photodetector which produces an electrical signal proportional to the intensity of electromagnetic radiation impinging the color photodetector in a selected range and an active integrator electrical circuit coupled to the output of the color photodetector;

each active integrator electrical circuit comprising:
an operational amplifier;
an integrating voltage storage device coupled to the operational amplifier, the integrating voltage storage device matched to the color photodetector to normalize the electrical signal from the color photodetector during the accumulate and store cycle;
an offset voltage storage device coupled to the operational amplifier, operable to store the voltage across the color photodetector during the offset cycle;
a store voltage storage device coupled to the operational amplifier, operable to store the voltage proportional to the normalized voltage stored on the integrating voltage storage device; and
a reference voltage coupled to the operational amplifier, operable to provide a constant voltage potential to the circuit; and
a switching logic circuit, operable to control the timing of the active integrator electrical circuit.

2. The color optical sensor of claim 1, wherein the color photodetector is a photodiode.

3. The color optical sensor array of claim 1, wherein the integrating voltage storage device is a capacitor.

4. The color optical sensor array of claim 1, wherein the offset voltage storage device is a capacitor.

5. The color optical sensor array of claim 1, wherein the store voltage storage device is a capacitor.

6. The color optical sensor array of claim 1, wherein each color optical sensor is manufactured using CMOS technology.

7. The color optical sensor array of claim 1, wherein the capacitance ratio of the integrating voltage storage device to the store voltage storage device results in a charge multiplication.

8. The color optical sensor of claim 1, wherein the integrating voltage storage device is matched to the color photodetector to provide optimal sensitivity of the color optical sensor.

9. The color optical sensor array of claim 1, wherein the color optical sensor array comprises color optical sensors that detect electromagnetic radiation corresponding to the colors red, green and blue.

10. The color optical sensor array of claim 1, wherein the reference voltage comprises ground.

11. The color optical sensor of claim 1, wherein the reference voltage comprises a DC voltage.

12. A method of forming a color optical sensor array having a plurality of optical sensors which respond to incident electromagnetic radiation corresponding with two or more selected colors, comprising the steps of:

fabricating each color optical sensor from a photodiode having sensor signal output and coupling the sensor signal output from each color photodiode with an active integrated electrical circuit;

supplying a reference voltage to each color optical sensor;

forming the active integrated electrical circuit with an operational amplifier having a non-inverting input, an inverting input and an operational amplifier output wherein the sensor signal output from the color photodiode is coupled to the operational amplifier non-inverting input and the operational amplifier inverting input is coupled to the reference voltage;

forming the active integrated electrical circuit with an integrating capacitor coupled to the operational amplifier negative input and to the operational amplifier output; and forming the active integrated electrical circuit with an offset capacitor coupled to the operational amplifier output and the reference voltage.

13. The method of forming the optical sensor array of claim 12, wherein the step of fabricating each color optical sensor with an active integrated electrical circuit further comprises the step of matching the integrating capacitor to the capacitance of the color photodiode to normalize the signal from the color optical sensor.

14. The method of forming the color optical sensor array of claim 12, further comprising the steps of:

forming the active integrated electrical circuit with a storage capacitor; and matching the capacitance of the integrating capacitor to the capacitance of the storage capacitor to multiply the charge on the storage capacitor.

15. The method of forming the color optical sensor array of claim 12, further comprising the step of manufacturing the optical sensor array using CMOS technology.

* * * * *